United States Patent
Klassen et al.

(10) Patent No.: US 11,397,571 B2
(45) Date of Patent: Jul. 26, 2022

(54) METHOD AND APPARATUS FOR REMOTELY UPDATING SATELLITE DEVICES

(71) Applicant: Kymeta Corporation, Redmond, WA (US)

(72) Inventors: Paul Klassen, Newcastle, WA (US); Ron Radko, Kirkland, WA (US); Jonas Nicholson, Preston, WA (US); Kevin KleinOsowski, Seattle, WA (US); Taylor Stokes, Monroe, WA (US); David Cooper, Bellevue, WA (US); Greg Eigsti, Sammamish, WA (US)

(73) Assignee: KYMETA CORPORATION, Redmond, WA (US)

( * ) Notice: Subject to any disclaimer, the term of this patent is extended or adjusted under 35 U.S.C. 154(b) by 0 days.

(21) Appl. No.: 16/249,840

(22) Filed: Jan. 16, 2019

(65) Prior Publication Data
US 2019/0220261 A1    Jul. 18, 2019

Related U.S. Application Data

(60) Provisional application No. 62/618,492, filed on Jan. 17, 2018.

(51) Int. Cl.
*G06N 5/04* (2006.01)
*G06F 8/61* (2018.01)
(Continued)

(52) U.S. Cl.
CPC ............... *G06F 8/61* (2013.01); *G06F 8/654* (2018.02); *G06F 9/4401* (2013.01); *G06N 20/00* (2019.01);
(Continued)

(58) Field of Classification Search
CPC .......... G06F 8/61; G06F 8/654; G06F 9/4401; H04B 17/101; H04B 17/14; H04B 17/16;
(Continued)

(56) References Cited

U.S. PATENT DOCUMENTS

| | | | |
|---|---|---|---|
| 8,555,273 B1 | 10/2013 | Chia et al. | |
| 9,032,388 B1 * | 5/2015 | Watson | G06F 21/57 717/173 |

(Continued)

FOREIGN PATENT DOCUMENTS

WO    2017210120 A1    12/2017

OTHER PUBLICATIONS

"Analysis of Satellite-Based Telecommunicates and Broadband Services", Nov. 2013 (Year: 2013).*

(Continued)

*Primary Examiner* — Chat C Do
*Assistant Examiner* — Noor Alkhateeb
(74) *Attorney, Agent, or Firm* — Womble Bond Dickinson (US) LLP

(57) ABSTRACT

System and methods are disclosed for remote management of mobile satellite antenna modules having an antenna subsystem module (ASM). An ASM periodically transmits a check-in message and metrics data to a server. The server analyzes the check-in message and metrics data to determine a state of operation of the antenna, and determine one or more management commands to improve the performance of the ASM. Information in the metrics data received from each ASM can be queried and processed using machine learning to determine correlation between attributes of the ASMs and performance of the ASMs.

21 Claims, 9 Drawing Sheets

(51) Int. Cl.
*G06N 20/00* (2019.01)
*H04L 9/30* (2006.01)
*H04L 9/32* (2006.01)
*G06F 9/4401* (2018.01)
*G06F 8/654* (2018.01)
*H04B 17/14* (2015.01)
*H04B 17/10* (2015.01)
*H04B 17/16* (2015.01)
*H04B 17/18* (2015.01)
*H04B 17/26* (2015.01)

(52) U.S. Cl.
CPC ........... *H04B 17/101* (2015.01); *H04B 17/14* (2015.01); *H04B 17/16* (2015.01); *H04B 17/18* (2015.01); *H04B 17/26* (2015.01); *H04L 9/30* (2013.01); *H04L 9/3247* (2013.01)

(58) Field of Classification Search
CPC ........ H04B 17/18; H04B 17/26; G06N 20/00; H04L 9/30; H04L 9/3247
See application file for complete search history.

(56) References Cited

U.S. PATENT DOCUMENTS

| | | | |
|---|---|---|---|
| 9,557,981 | B2 | 1/2017 | Throop et al. |
| 9,692,501 | B1* | 6/2017 | Mitchell ............ H04B 7/18508 |
| 9,787,800 | B2 | 10/2017 | Costa et al. |
| 9,996,262 | B1* | 6/2018 | Nemawarkar ........ G06F 3/0673 |
| 2006/0236325 | A1 | 10/2006 | Rao et al. |
| 2007/0118186 | A1* | 5/2007 | Knauper ................ G16H 40/63 607/59 |
| 2008/0040495 | A1 | 2/2008 | Adams et al. |
| 2008/0141240 | A1* | 6/2008 | Uthe ......................... G06F 8/61 717/174 |
| 2009/0031131 | A1* | 1/2009 | Qiu ......................... H04L 9/006 713/172 |
| 2009/0077549 | A1 | 3/2009 | Sadja et al. |
| 2009/0106406 | A1* | 4/2009 | Bernard .............. H04L 41/0856 709/223 |
| 2009/0119657 | A1 | 5/2009 | Link, II |
| 2012/0047371 | A1* | 2/2012 | Woodall .................. G06F 21/76 713/189 |
| 2013/0185563 | A1 | 7/2013 | Djabarov et al. |
| 2014/0195717 | A1* | 7/2014 | Petruzzo .............. G06F 3/0659 711/102 |
| 2014/0317614 | A1* | 10/2014 | Djabarov ................ G06F 8/654 717/173 |
| 2015/0121066 | A1* | 4/2015 | Nix ......................... H04W 4/70 713/155 |
| 2015/0242198 | A1 | 8/2015 | Tobolski et al. |
| 2015/0378715 | A1* | 12/2015 | Solnit ..................... G06F 21/57 713/2 |
| 2015/0382208 | A1 | 12/2015 | Elliott et al. |
| 2016/0182345 | A1* | 6/2016 | Herdrich .............. G06F 12/084 709/224 |
| 2016/0294614 | A1 | 10/2016 | Searle et al. |
| 2016/0306622 | A1* | 10/2016 | Kim ........................ G06F 8/654 |
| 2016/0321594 | A1* | 11/2016 | Linde .................... G06F 11/008 |
| 2017/0060559 | A1* | 3/2017 | Ye .......................... G06F 21/572 |
| 2017/0187100 | A1* | 6/2017 | Fotheringham .......... H01Q 1/42 |
| 2017/0195459 | A1 | 7/2017 | Costa et al. |
| 2017/0237161 | A1* | 8/2017 | Roy ........................ H01Q 1/42 343/757 |
| 2017/0353544 | A1* | 12/2017 | Lala .................... H04L 67/1034 |
| 2018/0167380 | A1* | 6/2018 | Debickes ................ G06F 21/57 |
| 2018/0211176 | A1* | 7/2018 | Khurshudov ........ G05B 19/406 |

OTHER PUBLICATIONS

Notice of Allowance and Examiner's Search Results on the Patentability of U.S. Appl. No. 16/249,841, dated Feb. 8, 2021, 10 pages.
Korean Office Action and Search report on the Patentability of Application No. 10 2020 7023397 dated Jan. 7, 2022, 15 pages.
Extended European Search Report on the Patentability of Application No. 19741940.1-1224/3741097 PCT/US2019014048 dated Sep. 13, 2021, 10 pages.

* cited by examiner

METHOD AND APPARATUS FOR REMOTELY UPDATING SATELLITE DEVICES

RELATED APPLICATIONS

This application claims priority of U.S. Provisional Patent Application Ser. No. 62/618,492, entitled "METHOD AND APPARATUS FOR REMOTELY UPDATING SATELLITE DEVICES," to Paul Klassen et al., filed Jan. 17, 2018, and is hereby incorporated by reference in its entirety to the extent that it is consistent with this patent application. This application is also related to U.S. patent application Ser. No. xx/xxx,xxx, entitled "METHOD AND APPARATUS FOR REMOTELY UPDATING SATELLITE DEVICES," to Paul Klassen et al., filed Jan. 16, 2019, and is hereby incorporated by reference in its entirety to the extent that it is consistent with this patent application.

TECHNICAL FIELD

Embodiments of the present disclosure relate generally to updating software and data of remote devices accessible by satellite communication.

BACKGROUND

Electronic devices having operating software may need to have operating software updated, patched, or otherwise changed. In addition, electronic devices may need to have one or more operating parameters or configuration information changed to improve the operation of the electronic device. In the prior art, an electronic device such as a computer, laptop, tablet, or smart phone may have operating software that is updated over a reliable, high-speed network connection with the assistance of a user of the electronic device.

A satellite communication device, such as a steerable satellite antenna, may only have access to a high-latency, unreliable network connection, and no access to a ground-based network connection having high speed and reliability. Unlike a conventional computing device, a user of the satellite communication device may not be available to assist in the updating of the operating software and configuration of the satellite device. The satellite communication device may also have operating parameters or configuration that are unique to a particular satellite device. The operating parameters or configuration may also need to be updated occasionally, due to a physical environment of the satellite communication device, or aging of the satellite communication device, or due to improved operating algorithms, or due to specific requirements of a given satellite network, without the assistance of a user of the satellite communication device.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
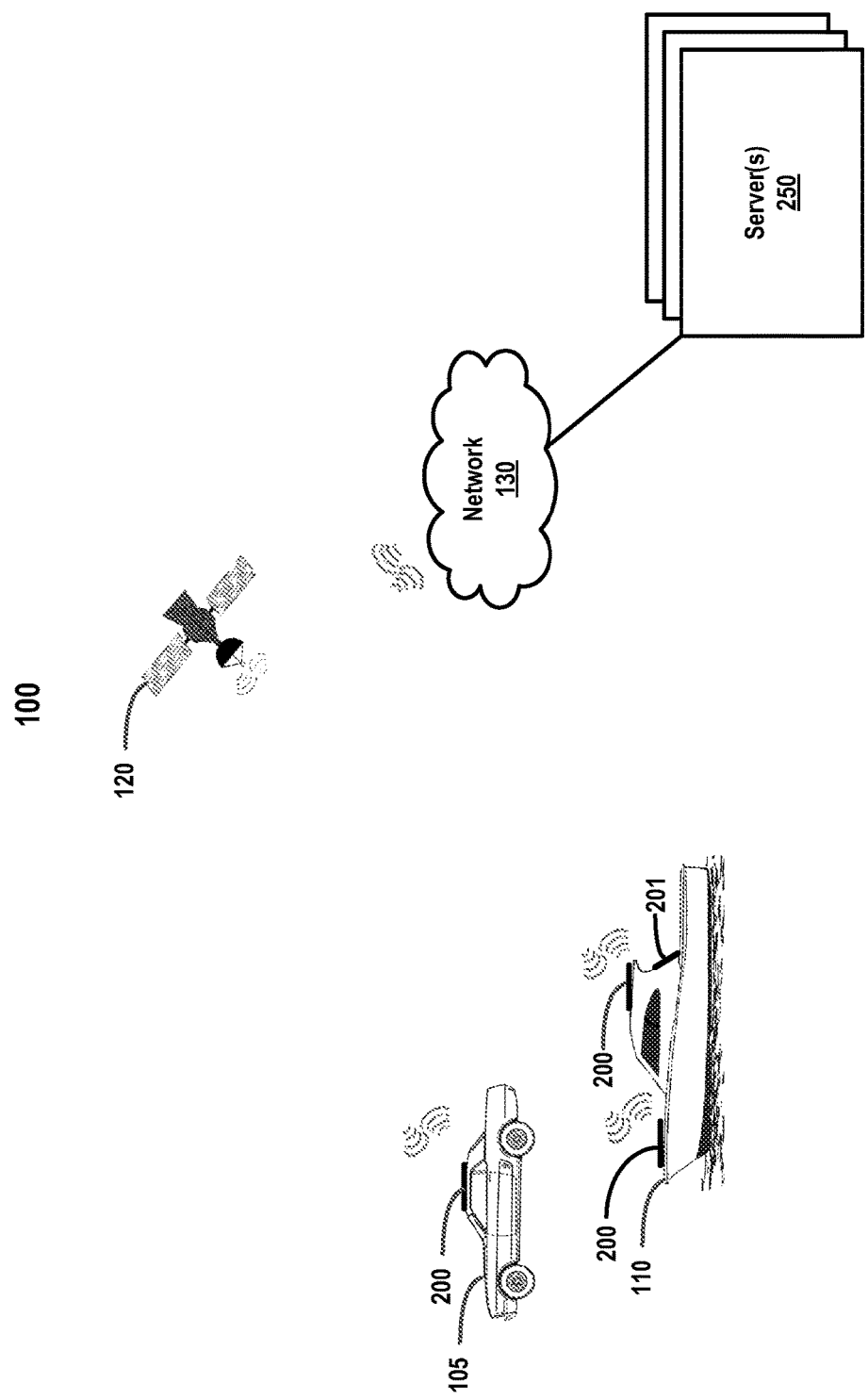
FIG. 1 is a block diagram illustrating a satellite-based network for managing an antenna subsystem module of a reconfigurable holographic antenna according to one embodiment of the disclosure

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

A method and apparatus for remotely coordinating and managing satellite antennas, remotes and devices over the air (OTA) are disclosed. In one embodiment, the satellite antennas are electrically steered antennas. In one embodiment, the satellite antennas are surface scattering antennas that radiate RF signals.

In one embodiment, remotely coordinating and managing satellite antennas, remotes and devices OTA includes dynamically provisioning firmware and configuration to a fleet of satellite devices over the air (OTA). The provisioning and configuration may include providing configuration updates as well as programming satellites to deal with environmental conditions. Feedback loops may be employed to determine which software version a satellite antenna has, to determine if an update is needed.

In one embodiment, one or more cryptographic methods (e.g., mutual authentication, 2-way Transport Layer Security (TLS), etc.) are used for ensuring integrity and identity of updates. In one embodiment, resilient downloads and updates are used on highly unstable and latent networks. In one embodiment, coordinating and managing satellite antennas, remotes and devices over the air (OTA) includes fleet delivery management and targeting.

The techniques disclosed herein are beneficial in that they may be used for automated secure remote management of satellite antennas, remotes and devices without the need for field technician. The techniques disclosed herein are beneficial in that they may provide the ability to group and coordinate firmware, configuration and statistics for a fleet of satellite antennas, remotes and devices. Thus, the techniques provide for remotely coordinating and managing satellite antennas, remotes and devices and leveraging satellite connectivity to update, configure and support devices in the field.

While the enclosed embodiments are described with reference to an antenna subsystem module of a reconfigurable holographic antenna, the embodiments are equally applicable to virtually any type of electronic device that is improved by updating software and/or configuration information within the electronic device.

In an embodiment that can be practiced on an electronic device, such as an antenna subsystem module of a reconfigurable holographic antenna, a computer-implemented method of updating the software and/or configuration of the electronic device (or "device") includes the electronic device receiving, from an electronic device management server (or "server"), an electronic device management command, in response to a periodic transmission of device operation and configuration data of the device to the server. In response to determining that the command requires downloading a first portion of software and/or data from the server, requesting by the device, that the first portion be downloaded to the device. The downloaded first portion is received, decrypted, and verified by the electronic device, then installed in a storage partition. The electronic device is then rebooted to the storage partition to make the downloaded software and/or data active for the device. In an embodiment, the device establishes a secure connection with the server, prior to receiving the electronic device management command, then encrypts and digitally signs the operation and configuration data prior to transmitting the electronic device operation and data to the server. In an embodiment, the method can also include the device requesting that a second portion of the software and/or data be downloaded to the device. In response to the device determining, prior to receiving the second portion, that the secure connection has timed-out, the device waits a period of time and reestablishes the secure connection with the server, then requests that the second portion of the software and/or data be downloaded from the server to the device. The method can also include, after receiving, decrypting, and verifying the downloaded first portion, and the device transmitting a status message to the server indicating that the first portion was received, decrypted and verified. In an embodiment, in response to the device determining that the command does not require downloading a first portion of software and/or data, and the command is a diagnostic command specifying a debug mode, a command processor of the device can set a control software of the device to activate the debug mode, log information related to the debug mode, and then encrypt, digitally sign, and transmit the logged information to the server. The secure connection and digital signing can be based upon one of: a public key infrastructure or symmetric key pair architecture. The electronic device can be an antenna subsystem module of a reconfigurable holographic antenna.

In an embodiment that can be practiced on an electronic device management server (or "server"), a method of performing device-specific management of an electronic device (or "device") can include establishing, by the server, a secure connection with a specific device, in response to a request for a secure connection from the device. The server can receive, decrypt, and store metrics data of the device, received from the device. In an embodiment, the metrics data can be preceded by, or accompanied by, a header indicating, e.g., a serial number of the antenna subsystem module (ASM) and reconfigurable holographic antenna, a software version and an active partition running on the ASM, details of a file system on the ASM, and other data. In an embodiment, the metrics data can comprise a file. The server can then analyze the metrics data for the device to determine a serial number of the device, a current software version running on the device, and current operating parameters for the device. In an embodiment, the serial number can be stored in a header received by the server from the ASM. By accessing a database of device configuration and performance information, the server can retrieve previous metrics data for the device, then generate, encrypt, and transmit to the device a list of one or more electronic device management commands to the device for execution on the device. In an embodiment, the storing and accessing is performed by the server using a serial number of the device. The method can further include the server receiving and storing a status message from the device, in response to the device performing an operation of a command in the command list. The server can respond to requests for software and/or data from the device, based on a particular command in the list of one or more electronic device management commands. In an embodiment, in response to determining that there is a newer version of software than the current version of the software identified in the metrics data, the server can add a command to the list of one or more commands to update the software on device. In response to determining that there are improved configuration parameters available for the device than the current configuration parameters identified metrics data, the server can add a command to the list of one or more commands to update one or more configuration parameters of the device. In an embodiment, the server can determine one or more additional electronic devices associated with the electronic device, and generate, encrypt, and transmit a list of one or more electronic device management commands to each of the devices for execution on that device.

In an embodiment, any of the above methods can be performed by a processing system having at least one hardware processor, and a memory programmed with executable instructions that, when executed by the processing system, perform the operations of the methods.

In an embodiment, any of the above methods can be implemented with executable instructions programmed onto a non-transitory computer readable medium, such as a memory or storage. When the executable instructions are executed by a processing system having at least one hardware processor, the processing system causes the method operations to be performed.

FIG. 1 is a block diagram illustrating a satellite-based network 100 for managing an antenna subsystem module of a reconfigurable holographic antenna according to one embodiment of the disclosure.

A satellite-based network 100 can include, e.g. one or more reconfigurable holographic antennas each having an antenna subsystem module (hereafter, "steerable antenna") 200. A steerable antenna 200 is an electronic device capable of bi-directional communication with a satellite 120. The steerable antenna 200 can be installed on a vehicle, such as a car 105 or boat 110, or other mobile installation. A steerable antenna 200 can also be installed in a fixed location, such as on a building, in place of, or in addition to, a land-based communication system.

An installation can have one or more steerable antennas 200, as shown on boat 110. Multiple steerable antennas 200 in a single installation can improve signal performance based upon location of the antennas in the installation, such as different locations having different visibility to one or more satellites. The multiple steering antennas 200 can be interconnected using a combiner 201, as shown on boat 110. In an embodiment, combiner 201 can initiate bi-directional communication with satellite 120. In an embodiment, combiner 201 can select one or more of the steerable antennas 200 connected to combiner 201 to initiate communication with satellite 120.

The satellite-based network 100 can also include one or more servers 250 that can serve updates of software, configuration information, and other information to manage steerable antennas 200 in the satellite-based network 100. Servers 250 can also store information regarding each steerable antenna 200 in the satellite-based network 100, in association with a unique identifier of each steerable antenna 200.

The satellite-based network 100 can also include one or more technician support stations that can interact with an ASM management module of servers 250 to assist in managing a steerable antenna 200. Servers 250 can be any kind of servers or a cluster of servers, such as Web or cloud servers, application servers, backend servers, or a combination thereof. Servers 250 can include data analytics servers that can perform machine learning on data retrieved from steerable antennas 200 to determine solutions to identified problems. The solutions can be used to improve performance for one or more steerable antennas 200, such as with a new software update, patch, hot fix, configuration, algorithm, or tunable parameter of one or more steerable antennas 200.

Network 130 may be any type of network such as a local area network (LAN), a wide area network (WAN) such as the Internet, a cellular network, a satellite network, or a combination thereof, wired or wireless.

Figure 2A:
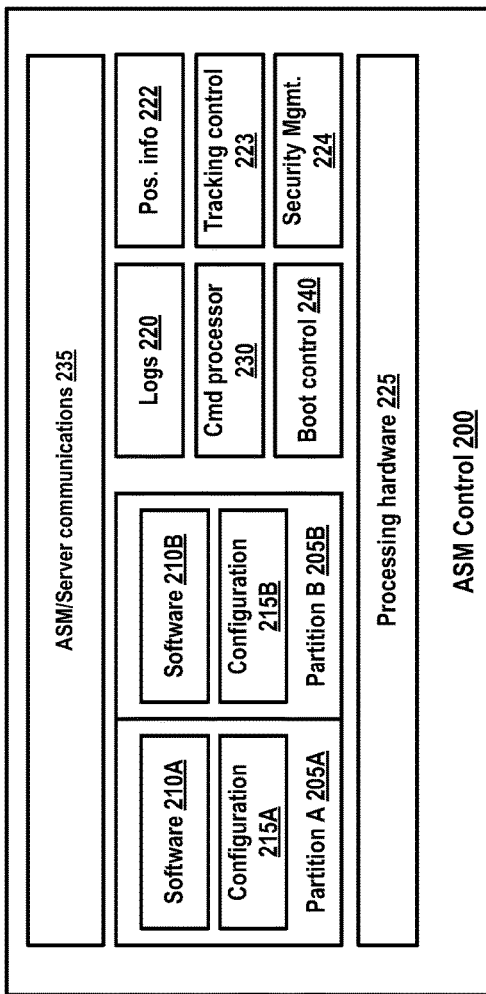
FIG. 2A is a block diagram illustrating components of an antenna subsystem module for a reconfigurable holographic antenna according to one embodiment.

FIG. 2A is a block diagram illustrating components of an antenna subsystem module (ASM) of a steerable antenna 200 according to one embodiment. In the description below, reference 200 will be used to refer to both the ASM and the steerable antenna, interchangeably, unless a distinction is required for clarity.

ASM 200 can include at least two storage partitions: partition A 205A and partition B 205B. ASM 200 can also include processing hardware 225, log files 220, position information module 222, tracking control module 223, security management 224, command processing logic (or, command processor) 230, ASM/Server communications 235, and boot control logic 240.

Processing hardware 225 can include one or more hardware processors interconnected with memory, storage, one or more timers, and communications hardware via a bus. Exemplary processing hardware is described below with reference to FIG. 8. Storage can include two or more storage partitions, partition A 205A and partition 205B. Each of the partitions can include operating software, e.g. software 210A for partition 205A, and configuration information, e.g. configuration 215A for partition 205A. When the ASM 200 boots, boot control module 240 can control which partition, 205A or 205B, the ASM 200 boots to.

For example, software 210A in partition 205A may be an older version of software than 210B in partition 210B. Software 210B can be, e.g. an update that was just installed into partition B. After completion of the installation of updated software 210B, boot control 240 can reboot the ASM 200 to partition 205B to use software 210B. If software 210B fails to boot, then boot control module 240 can reboot again to partition 205A to use software 210A.

Similarly, configuration information 215A in partition 205A may be an older version of configuration data than 215B. Configuration information 215B can be, e.g., an update that was just installed into partition 205B. After completion of the installation of updated configuration information 215B, boot control 240 can reboot the ASM 200 to partition 205B to use configuration information 215B. During rebooting to partition 205B, a power-on self-test (POST) can be performed and logs can be generated indicating start-up performance of the ASM 200 using the updated configuration information 215B. In addition, one or more performance monitors in software 210B can be used to determine whether the updated configuration information 215B yields improved performance over configuration information 215A. If performance is not improved, boot control 240 can reboot to the previous partition 205A to use the previous configuration information 215A.

In an embodiment, updating the configuration information, e.g. 215A, can be performed in the same partition, e.g. 205A so that rebooting to a different partition is not needed to activate the updated configuration information. Thus, one partition can hold multiple copies of configuration information 215. Boot control 240 can store a reference to the currently active partition and currently active configuration information such that boot control 240 can "hot-swap" between multiple versions of the configuration information in a partition to compare performance of each copy of configuration information.

ASM control 200 can further include a command processor 230. Command processor 230 can receive a package of information from server 250. Command processor 230 can decrypt the received package and verify that the package was successfully downloaded by computing a checksum of the decrypted package and comparing the checksum with a stored checksum in the package. Encryption of the package can be by symmetric key or asymmetric key encryption. In an embodiment using asymmetric key encryption, such as public key infrastructure (PKI), the package is encrypted by server 250 using a private key of the server 250 then the package is transmitted to the ASM 200. The ASM 200 decrypts the package using a public key of the server 250. In an embodiment, each package transmitted by the server 250 and received by the ASM 200 may include a digital signature of the server verifiable by the ASM 200 and/or a security certificate of the server 250, verifiable by a third party certificate service.

Command processor 230 can parse the received, decrypted and verified package from the server 250 to extract one or more commands from the server 250 for the ASM 200 to perform, and associated parameters, values, or other data from the package. Commands can include, but are not limited to a command informing the ASM 200 that a software update is available, a command informing the ASM 200 that one or more updated parameters are available that may improve ASM 200 performance, a command instructing the ASM 200 to reset one or more parameters of the ASM 200 that were altered by manual optimization by the user, an command to set, or clear, a variable indicating that the ASM 200 should request an update to software, and a command to enter a debug mode, log output of the debug mode, and transmit the debug log(s) to the server 250. Logs 220 can include the debug logs. Logs 220 can also include logging of information during regular operation of the ASM 200, including environmental temperature and humidity of an area surrounding the ASM, temperature of one or more segments of the steerable antenna, power-on self-test information, partition information, such as which partition is the currently active partition, the software version in the currently active partition, file sizes in the partitions, serial number of the steerable antenna, control variables of different operating processes of the steerable antenna and antenna subsystem module, quality metrics of antenna performance, and other data. Position information module 222 can manage information regarding location tracking of the ASM 200 and reconfigurable holographic antenna with respect to, e.g., a GPS satellite, to assist in beam steering. Tracking control module 223 can track one or more satellites with which the reconfigurable holographic antenna 200 may communicate. Tracking control module 223 can cooperate with position information module 222 to provide information for beam steering by the reconfigurable holographic antenna. Security management module 224 can assist ASM/Service communications 235 to setup and maintain secure communication channels. Security management module 224 can also implement security over portions of memory, login credentials, and implementation of encrypted and signed data transfer.

ASM 200 can further include an ASM-to-Server (ASM/Server) communication module 235. ASM/Server communications 235 can initiate a mutual transport layer security (TLS) connection between the ASM 200 and server 250. The connection is secured using symmetric key cryptography to secure data transmitted using keys that are generated uniquely for the ASM 200 and are based on a chained authority trusted by the Server 250. The identity of the communicating parties (ASM 200 and Server 250) can be optionally authenticated using either public-key cryptography or symmetric key encryption.

Figure 2B:
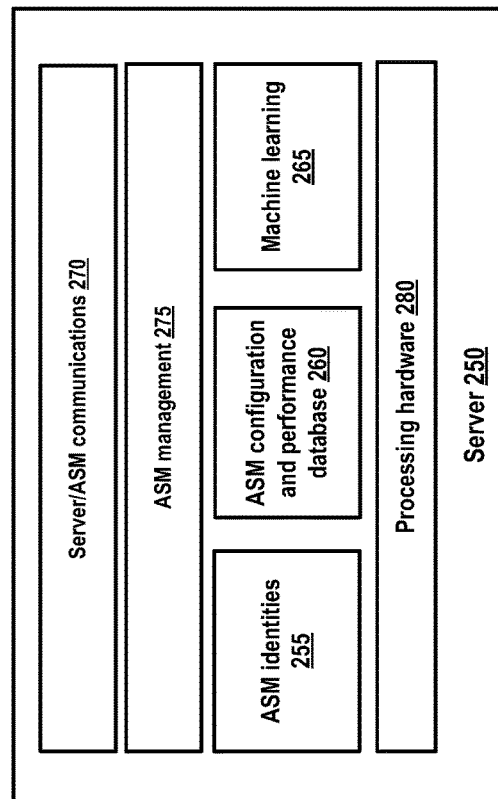
FIG. 2B is a block diagram illustrating components of a server that manages configuration of an antenna subsystem module for a reconfigurable holographic antenna according to one embodiment.

FIG. 2B is a block diagram illustrating components of a server 250 that manages configuration of an antenna subsystem module for a reconfigurable holographic antenna according to one embodiment.

Server 250 can include server-to-ASM (Server/ASM) communication module. Server/ASM can respond to an ASM 200 request for initiating a mutual transport layer security (TLS) connection between the ASM 200 and server 250, and negotiate the connection as described above for ASM 200.

Server 250 can also include ASM management software 275, a database of ASM identities of ASM's 200, a database of ASM configuration and performance information for each ASM 200 having an identity in ASM identities 255, and processing hardware 280. Exemplary hardware for implementing server 250 is described below with reference to FIG. 8.

ASM management software 275 receives periodic "check-ins" from each ASM 200 that is configured to "check-in" with server 250 periodically. In an embodiment, the check-in increment is one hour, but is configurable to any time period. During an ASM 200 check-in, an ASM sends a metrics package to the server 250. The ASM metrics package includes a serial number of the ASM 200, a currently active partition indication including the currently active software version and configuration parameters of the steerable antenna. The package can also include power-on self-test (POST) results, temperature and humidity of the environment where the ASM is installed, and temperature of each segment of the steerable antenna. The package can further include file system information, such as a current file size of each file, list of files in a partition, and the like. ASM management 275 receives, decrypts, and stores the package in ASM configuration and performance database 260. ASM management 275 then inspects ASM configuration and performance database 260 to determine: (1) whether there is a update to the ASM 200 software available, (2) whether there is a debug or diagnostic request pending for the ASM, (3) whether there are updated configuration parameters for the ASM 200 that can be installed, or (4) whether one or more configuration parameters have been manually optimized by a user, and the manual optimization resulted in poorer performance and should be reset to previous configuration parameters.

Software Updating

When ASM management 275 receives the metrics package from the ASM 200, ASM management 275 extracts the serial number of the ASM 200 and the software version of the currently active partition. ASM management 275 looks up, in ASM configuration and performance database 260, whether there is an updated version of software that is applicable to this particular ASM 200. If so, then ASM management 275 uses ASM 200's serial number to lookup, in ASM configuration and performance database 260, a number of times that this ASM 200 has previously attempted to install this particular version of updated software. If the previous attempts number is greater than zero, then ASM management 275 determines that this ASM 200 has previously tried to install the update of software and rebooting to this updated version of software was unsuccessful on this ASM 200. Alternatively, or in addition, ASM management 275 inspect the metrics package received from the ASM 200 to determine that the software installed on the currently active partition of this ASM 200 is outdated, and that the software installed in the other, non-active, partition is the same version as the updated software that the ASM management 275 proposes to tell the ASM 200 to install. If the number of retries (failed reboots with the new software) is less than a predetermined maximum number of times, e.g. three times, ASM management 275 will send a command to ASM 200 to request the updated software for installation. If the number or retries is the maximum number or more than the maximum number, then ASM management 275 can send a command to ASM 200 to stop requesting the updated software, and can further set a flag in ASM configuration and performance database 260 that this ASM 200 has not be able to successfully install this software update. A technician may use ASM management 275 to access ASM configuration and performance database 260 to diagnose why the installation of the software update was unsuccessful.

Debug or Diagnostic

A support technician, who may have been in communication with a user of the steerable antenna 200, can access the ASM performance and configuration database 260, using the serial number of the ASM 200, via ASM management 275 to determine an action to help resolve a problem for the user. In an embodiment, the support technician can instruct ASM management 275 to send a command to ASM 200 to enter a debugging mode than may have a more verbose logging of specific information that may help the technician resolve the problem. ASM management 275 accesses the ASM configuration and performance database 260 to retrieve the debugging command, and transmits the debugging command to ASM 200 to execute. In response, ASM 200 will execute the command, perform the requested logging, and ASM management 275 will receive and store the logs generated by the debug command in ASM configuration and performance database 260, and the debug command will end. A support technician can retrieve and inspect the logs, and further determine how to resolve the problem via ASM management 275. In an embodiment, the support technician can send a "hot-fix" or "patch" intended to resolve the problem. ASM management 275 can send the hot-fix or patch to ASM configuration and performance database 260 for storage. ASM management 275 can either store the hot-fix or patch in association with the serial number of the ASM 200 to be patched, or store the hot-fix or patch in a dedicated storage area and store a reference to the hot-fix or patch in association with the serial number of the ASM 200. ASM management 275 can instruct ASM 200 to download and install the hot-fix or patch.

Update Parameters

When ASM management 275 receives the metrics package from the ASM 200, ASM management 275 extracts the serial number of the ASM 200 and the currently active configuration parameters for the ASM 200. The package received from ASM 200 can contain headers and data in any format agreed upon between the ASM 200 and server 250. In an embodiment, a header in the package contains a serial number uniquely identifying the ASM 200 and associated reconfigurable holographic antenna. ASM management 275 looks up, in ASM configuration and performance database 260, whether there is an updated version of one or more configuration parameters that is applicable to this particular ASM 200. If so, then ASM management 275 sends a command to ASM 200 to request the updated configuration parameters. When ASM management 275 receives the request from ASM 200, ASM management 275 will generate a package with the command to install the updated configuration parameters and data containing the updated configuration parameters.

Reset Manually Optimized Parameters

Some or all of the configuration parameters of ASM 200 can be manually optimized through ASM 200 software self-optimization. It is possible that self-optimization may change one or more configuration parameters, but that the result may be that the ASM 200 performance is lower than before the manual self-optimization process on the ASM 200. When ASM management 275 receives a periodic check-in package from ASM 200, ASM management 275 can extract the serial number of the ASM 200, performance metrics, and configuration parameters from the package, and use the serial number to look up previous configuration parameters and performance metrics for this ASM 200 that are stored in ASM configuration and performance database 260. If ASM management 275 determines that performance of ASM 200 was better with the previously stored configuration parameters, or with factory configuration parameters installed in the ASM 200 when it was shipped, then ASM management 275 can send a package with a command to install new configuration parameters that are included in the package with the command. Alternatively, ASM management 275 can send a command to the ASM 200 to request reset of configuration parameters that were changed due to manual optimization.

Server 250 can also include a machine learning module 265. Machine learning module 265 can receive, e.g. from a support technician via ASM management 275, criteria with which to perform machine learning upon selected data stored in the ASM configuration and performance database 260. For example, a technician may have received notice from one or more users that the reception in a certain geo-location is poor and certain times of day. Machine learning 265 can receive a request to perform machine learning upon data selected from ASM configuration and performance 260 that correlates performance of a steerable antenna to a specified geo-location and time of day. This may help locate regions with poor satellite coverage at certain times of day, and help define the bounds of the region. As a second example, machine learning 265 can receive a request to correlate manually self-optimized configurations with performance to determine whether a self-optimization algorithm is performing its intended function of improving performance.

Figure 3:
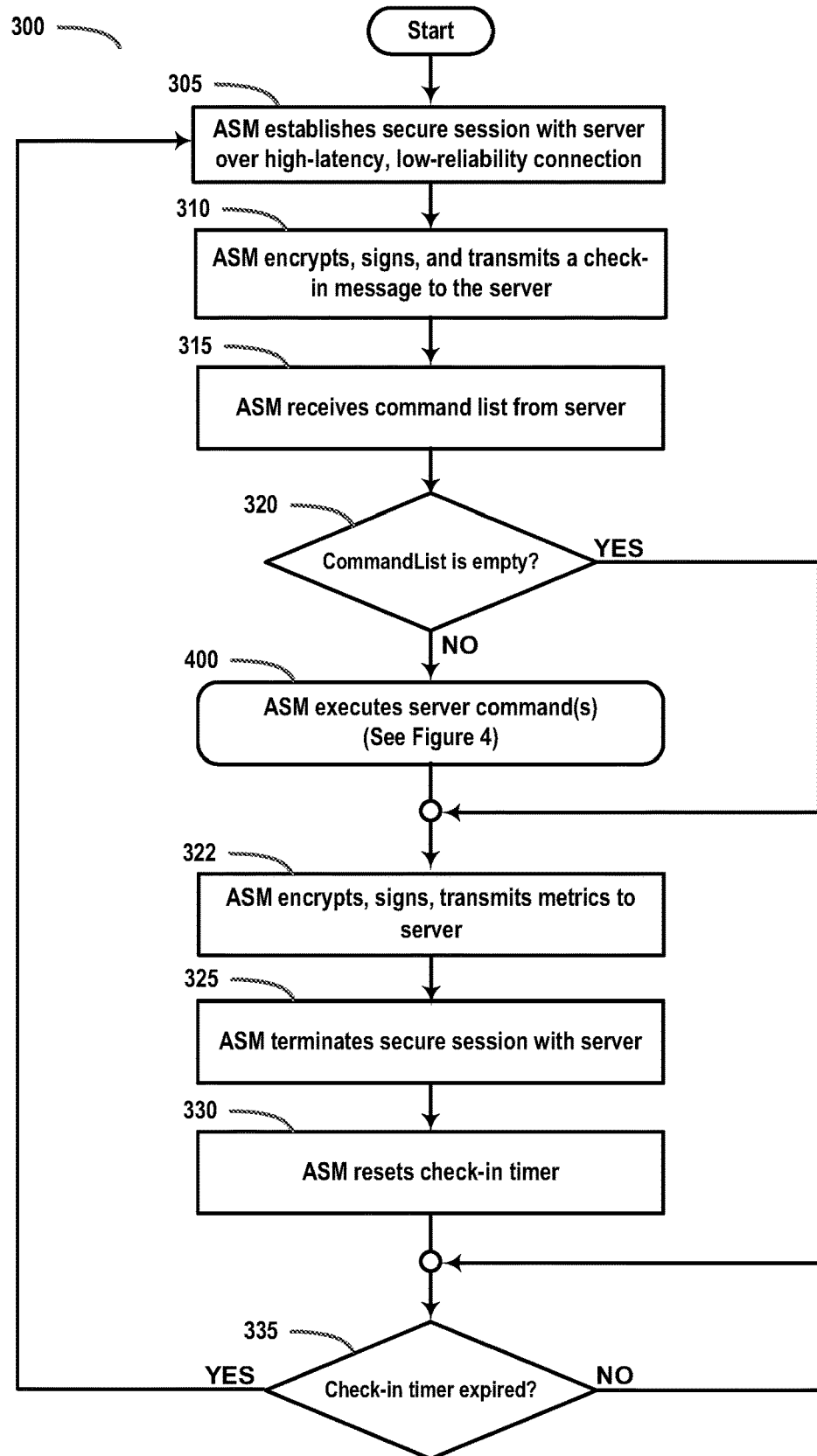
FIG. 3 illustrates an overview of a method that can be practiced on an antenna subsystem module for managing the antenna subsystem module in coordination with an antenna subsystem module management server, according to an embodiment

FIG. 3 illustrates an overview of a method 300 that can be practiced on an antenna subsystem module (ASM) 200 for managing the steerable antenna in coordination with an antenna subsystem module management server 250, according to an embodiment. Method 300 represents a high-level overview of an interaction between ASM 200 and management server 250. In general, for transmissions between ASM 200 and server 250, a secure connection is established by the ASM 200, and each transmitted package of information is encrypted with a private key of the sender (ASM 200 or server 250), digitally signed by the sender, and decrypted and verified by the recipient, using a public key of the sender. Each ASM 200 that is so-configured performs a check-in procedure at a regular increment of time, e.g. every hour. During the check-in procedures, the ASM 200 sends metrics data of the ASM to the server 250. In an embodiment, the metrics data can be preceded by, or accompanied by, a header indicating, e.g., a serial number of the ASM and reconfigurable holographic antenna, a software version and partition running on the ASM, details of a file system on the ASM, and other data. In an embodiment, the metrics data can comprise a file. The metrics data includes, but is not limited to, a serial number of the ASM 200, an indication of the active partition of the storage that the ASM 200 is currently booted to, a software version that is installed and running in the active partition, temperature and humidity of the environment surrounding the ASM 200, temperature of each segment of the steerable antenna connected to the ASM 200, control variables of processes running on the ASM 200, and file system information of the ASM 200.

In operation 305, ASM 200 sends a request to establish a mutual transport layer security (TLS) connection with the server 250. In the general case, the transmission will be over a satellite connection that is high-latency and low-reliability and whose connection cannot be verified at any given moment. Thus, detection of loss of a connection is performed by the ASM 200 by setting a timer for an expected response by the server 250.

In operation 310, the ASM encrypts, signs, and transmits a check-in message to server 250. The check-in message can includes a header indicating a currently active file system partition, a currently active version of software, a serial number of the ASM 200 and reconfigurable holographic antenna, and other data.

In operation 315, ASM 200 receives a package from the server 250, decrypts and verifies a checksum of the package, and verifies that the server 250 is the sender of the package.

ASM 200 extracts a command list of zero or more commands, and any associated command parameters or data sent by the server 250.

In operation 320, it can be determined whether the command list is empty. In an embodiment, the command list can be determined to be empty if a count of commands in the command list is zero or if the command list is a null string. If so, then method 300 continues at operation 325, otherwise method 300 continues at operation 400.

In operation 400, the ASM 200, command processor 230, executes one or more server commands as described more fully below, with reference to FIG. 4.

In operation 322, ASM 200 can encrypt, sign, and transmit a package of data to server 250. The package can include log files, debugging data resulting from executing a debugging command, metrics of the ASM 200 and reconfigurable holographic antenna, operating variables and parameters, or other data.

In operation 325 ASM 200 terminates the secure connection with the server 250.

In operation 330 ASM 200 resets its check-in timer. In an embodiment, the check-in timer is set to one hour, but is configurable to other values. The check-in time is a periodic time at which the ASM 200 sends metrics data to the server 250 for analysis. The analysis by the server 250 can determine whether there is a software update available for this particular ASM 200, whether there any updates to the configuration parameters of the ASM 200, and other functions as described below.

In operation 335, it can be determined whether the check-in timer has expired, indicating that it is time for the ASM 200 to send a metrics package to the server 250. If so, then method 300 continues at operation 305, otherwise method 300 loops back to 335 to check the whether the check-in timer has expired.

Figure 4:
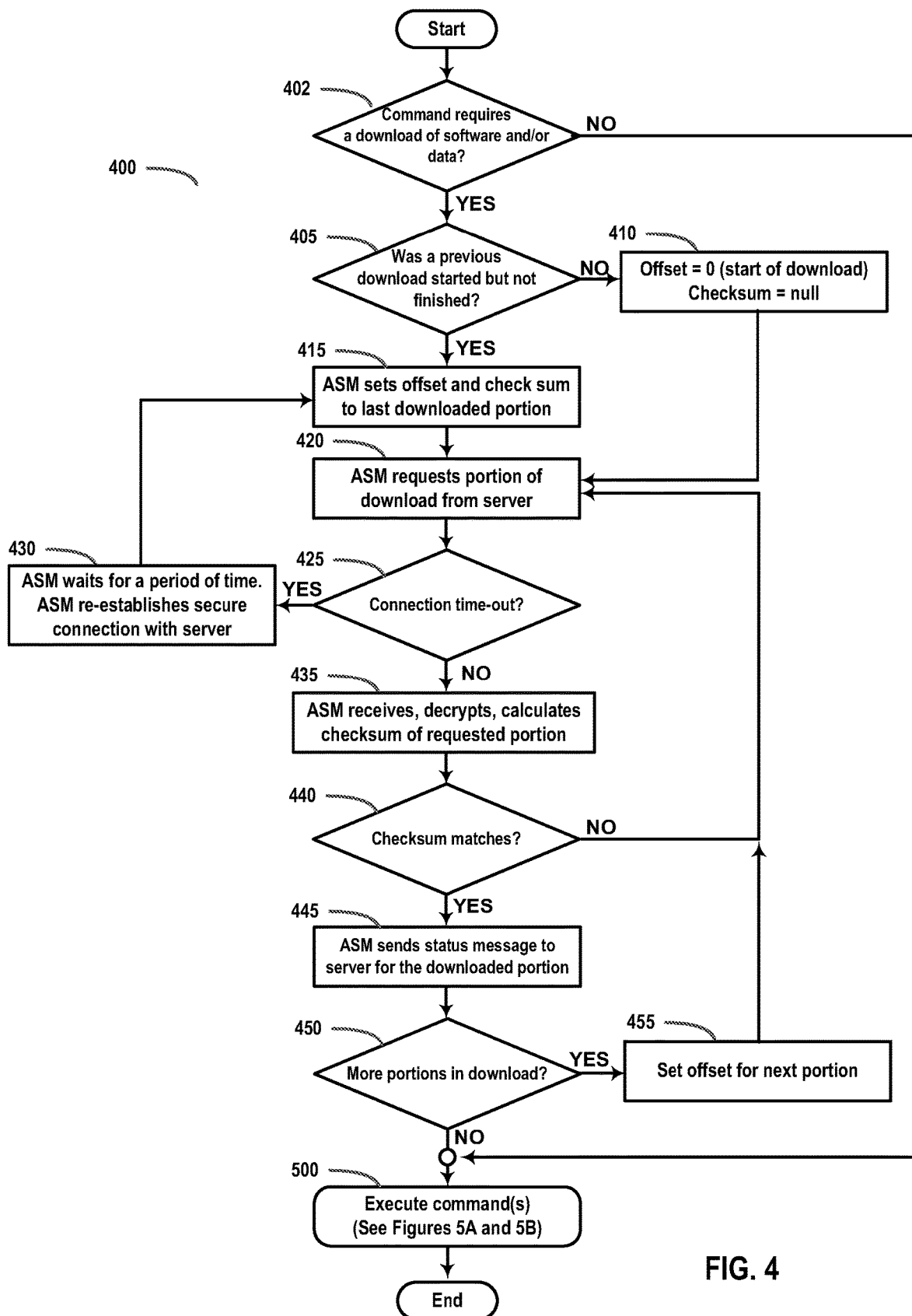
FIG. 4 illustrates a method that can be practiced on an antenna subsystem module of a reconfigurable holographic antenna for downloaded software and/or data from an antenna subsystem module management server, according to one embodiment.

FIG. 4 illustrates a method 400 that can be practiced on an antenna subsystem module (ASM) 200 of a reconfigurable holographic antenna for downloading software and/or data from an antenna subsystem module (ASM) management server 250, according to one embodiment. Method 400 describes a download process wherein an ASM 200 downloads one or more portions of, e.g., a software update, configurable parameters update, or other packages from management server 250 to ASM 200. Method 400 can operate over a high-latency, low-reliability connection using a mutual transport layer security (TLS) connection. Neither the sender nor receiver can detect the loss of the connection by direct means. Instead, the ASM 200 will use a connection time-out timer for each transmission. Beneficially, the ASM 200 tracks each portion of a download that has been received and an associated offset into the total download. If the ASM 200 connection timer expires, then ASM 200 can reestablish the secure connection, and transmit a request to the server 250 to resume the download from where it was interrupted, thereby avoiding a redownload of portions that have already been received, decrypted, and verified. Method 400 can be implemented by ASM 200 command processor 230.

In operation 402, ASM 200 determines whether the command to be executed requires a download. ASM 200 can inspect the package received from server 250 in operation 315, described above with reference to FIG. 3, to determine whether the command requires downloading a package from server 250. If a download is required by the command, then method 400 continues at operation 405, otherwise method 400 continues at operation 500.

In operation 405, ASM 200 can determine whether a portion of the download had been previously received, decrypted, and verified, followed by the ASM secure connection timer expiring, indicating that the connection with the server 250 had been lost. If a download for this command was previously started, but not finished, then method 400 continues at operation 410, otherwise method 400 continues at operation 415.

In operation 410, it has been determined that the download had not previously been started. The offset within the download that ASM 200 should request is set to zero (beginning of the download). Method 400 continues at operation 420.

In operation 415, it has been determined that the download had previously been started, a portion of the download was successfully received, decrypted, and verified, and then the download process was interrupted. In operation 415, ASM 200 sets the offset and checksum to the last portion of the download that was attempted but interrupted by ASM 200.

In operation 420, ASM 200 transmits a request to server 250 for a next portion of the download from the server 250. The request includes the offset of the last requested download portion (or zero, if no portion has been downloaded) and the checksum of the downloaded portion (or null, if no portion has been downloaded).

In operation 425, the ASM 200 can determine whether the connection timer indicates that the secure connection with the server 250 has timed out. If so, then method 400 continues at operation 430, otherwise method 400 continues at operation 435.

In operation 430, it has been determined that the secure connection between the ASM 200 and server 250 has timed out. ASM 200 waits a period of time and then requests reestablishment of the secure connection with server 250. In an embodiment, the wait time can be a fixed time, such as 1 minute. In an embodiment, the wait time can be a random amount of time between a specified minimum, such as 1 minute, and a specified maximum, such as 15 minutes.

In operation 435, ASM 200 receives and decrypts the download. ASM 200 also calculates a checksum of the decrypted download. In an embodiment, ASM 200 can also verify a certificate received with the download as belonging to the server 250.

In operation 440, it can be determined whether the calculated checksum matches a stored checksum in the downloaded portion. If not, then method 400 continues at operation 420 to retry downloading the same portion, otherwise method 400 continues at operation 445.

In operation 445, ASM 200 sends a status message to server 250 indicating successful download, decryption, and verification of the portion of the download.

In operation 450, it can be determined whether there are more portions to download. If so, then method 400 continues at operation 455, otherwise method 400 continues at operation 500, which is described below with reference to FIGS. 5A and 5B. After execution of the command in operation 500, method 400 ends.

In operation 455, it has been determined that there is another portion to download. ASM 200 sets the offset of the next portion and method 400 continues at operation 420 where the ASM request a next portion of the download.

Figure 5A:
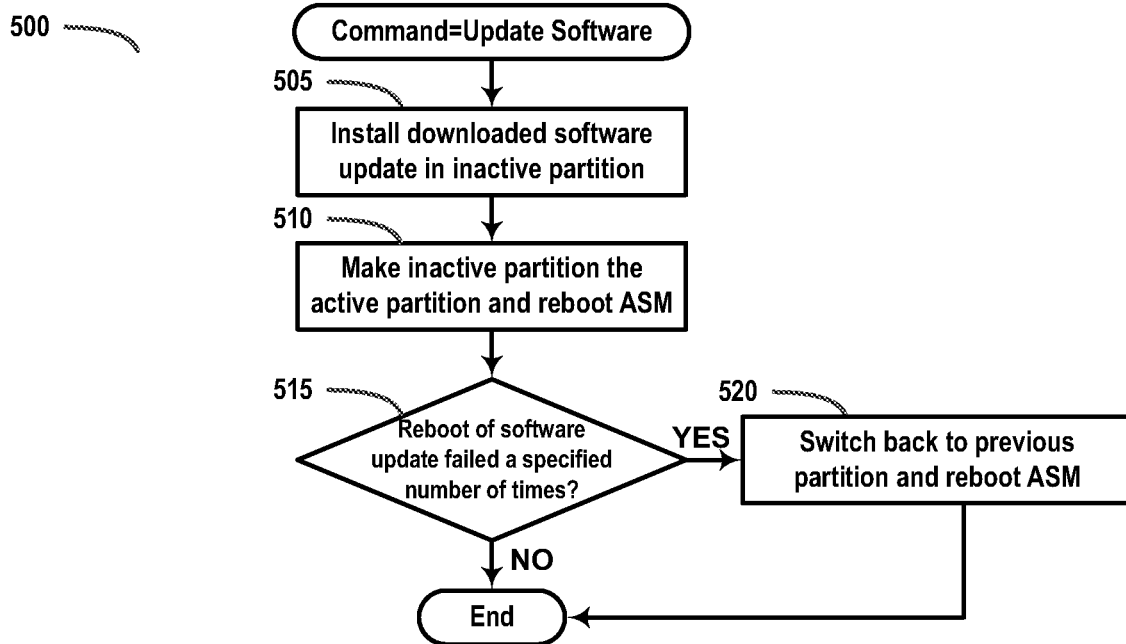
FIGS. 5A and 5B illustrate methods that can be practiced on an antenna subsystem module of a reconfigurable holographic antenna for executing commands received from an antenna subsystem module management server, according to one embodiment.
Figure 5A:
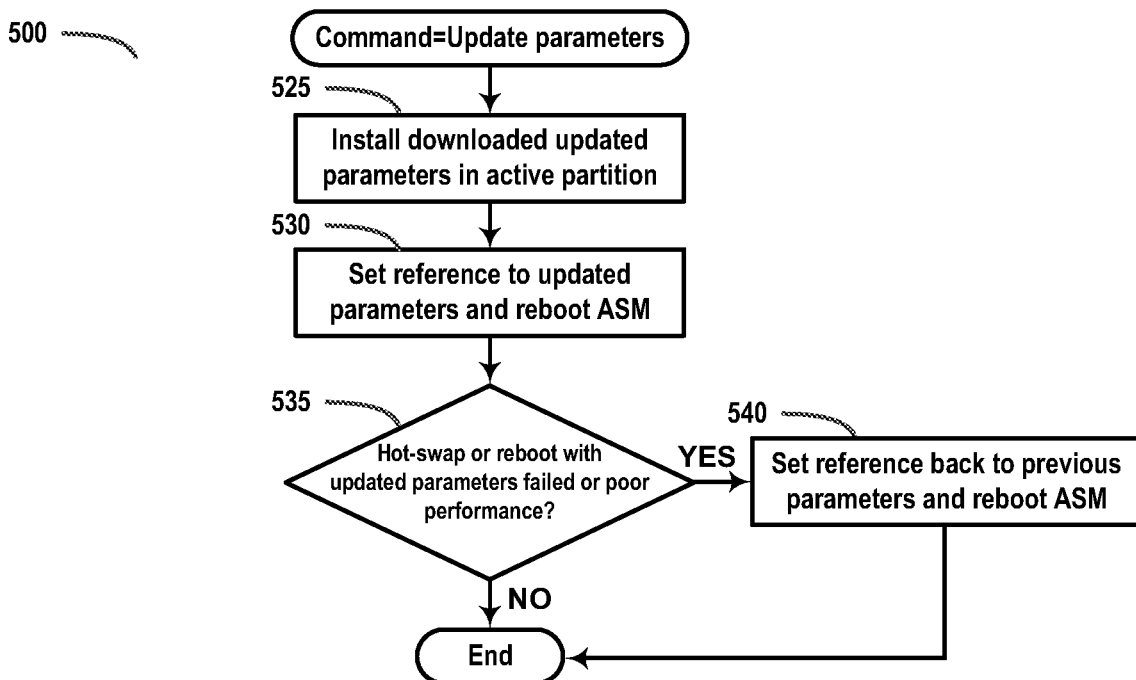
Figure 5B:
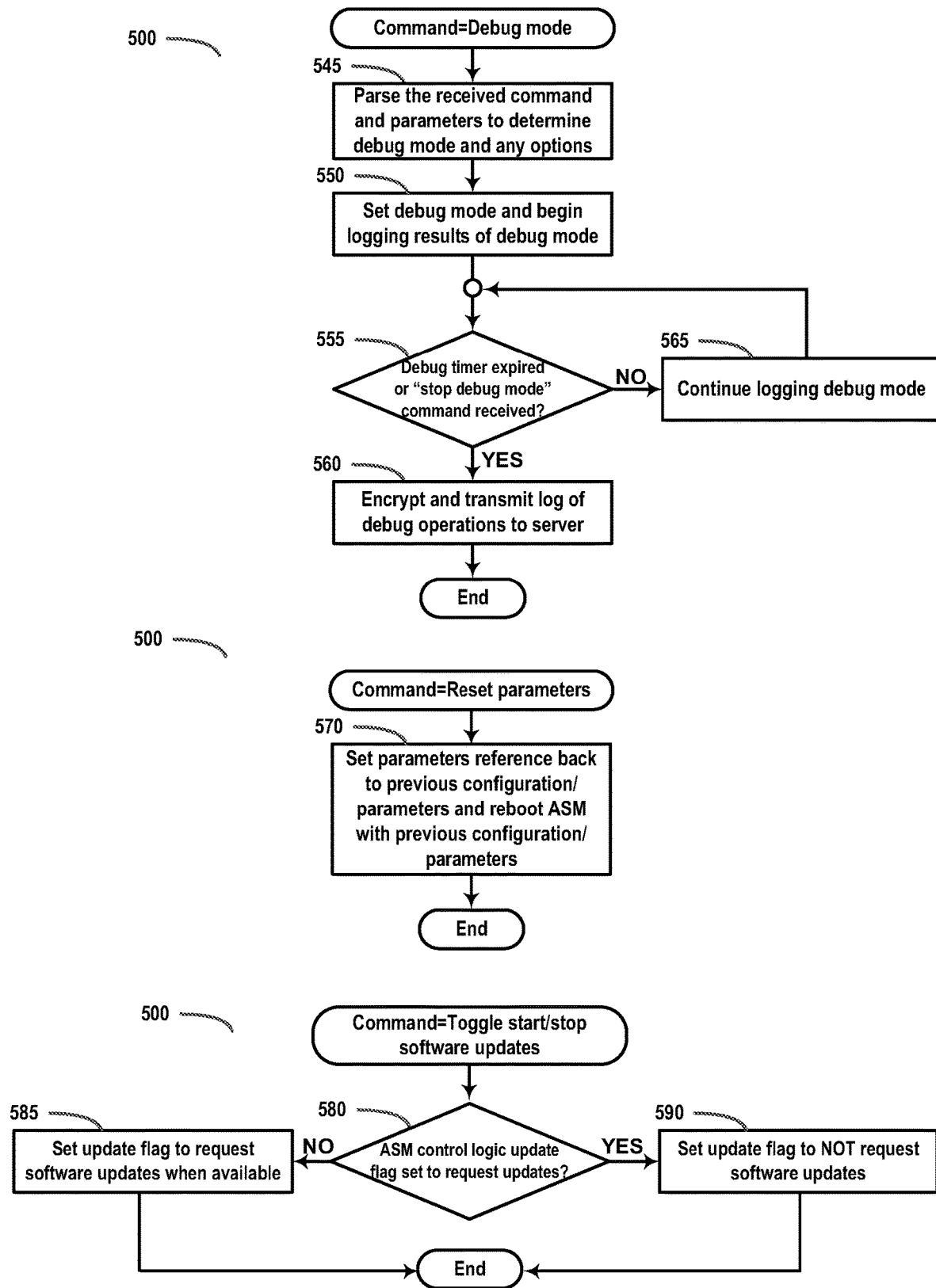

FIGS. 5A and 5B illustrates methods 500 that can be practiced on an antenna subsystem module 200 of a reconfigurable holographic antenna for executing commands received from an antenna subsystem module management server, according to one embodiment. FIGS. 5A and 5B describe five exemplary commands that the ASM 200 can execute using command processor 230. The five commands described are by way of example, and not limiting. Other command can be similarly implemented.

Referring to FIG. 5A, for the command "update software," in operation 505, the download of software to be installed has already completed and command processor 230 can install the downloaded software into a partition that is other than the currently active partition that runs the currently active software.

In operation 510, command processor 230 can set the active partition to the partition having the newly updated software. Command processor 230 then calls boot control 240 to reboot the ASM 200 to activate the new software.

In operation 515, it can be determined whether the ASM 200 failed to boot to the updated software in the new partition a specified number of times. In an embodiment, the specified number of times can be, e.g., five (5) times. In an embodiment, the specified number of times can be any integer value, e.g., an integer between 0 and 10, or other value, to determine when to set the active partition back to the previous partition with the previous version of the software. In an embodiment, boot control module 240 can track the number of times that the ASM 200 failed to boot to the updated software. If the ASM 200 failed to boot to the updated software the specified number of times, then in operation 520 the boot control 240 sets the active partition back to the partition having the previous version of software and reboots the ASM 200 using the previous version of software, and method 500 ends.

As described above with respect to method 300, ASM 200 will check-in with server 250 at the end of the check-in timer expiration. During a check-in process, ASM 200 will send metrics data that contains, among other data, the currently active software partition and software on the ASM 200. In an embodiment, the metrics data can be preceded by, or accompanied by, a header indicating, e.g., a serial number of the ASM and reconfigurable holographic antenna, a software version and partition running on the ASM, details of a file system on the ASM, and other data. In an embodiment, the metrics data can comprise a file.

Still referring to FIG. 5A, for the command "update parameters," in operation 525, the download of updated configuration parameters to be installed has already completed and command processor 230 can install the downloaded updated configuration parameters. ASM 200 command processor 230 can determine which partition to install the updated configuration parameters and store a reference to the updated configuration parameters. In an embodiment, the updated configuration parameters can be installed in the active partition. By doing so, the updated parameters will be installed into the same partition as the currently active software for the ASM 200. Command processor 230 can install the updated configuration parameters as a copy, rather than overwriting the previous configuration parameters, and store a reference to both the updated configuration parameters and the previous configuration parameters. Doing so will enable a support technician to initiate a hot-swap command and observe the performance difference between the two sets of configuration parameters via ASM management 275. A "hot-swap" command can be implemented as a debug mode command, as described below with reference to FIG. 5B.

Still referring to FIG. 5A, in operation 525, command processor 230 can install the downloaded updated configuration parameters as described above, either into the currently active partition or into another partition, and in operation 530, store a reference to the partition and location of the updated configuration parameters. ASM command processor 230 can either use the references to the updated and previous configuration parameters to hot-swap between the two sets of configuration parameters, or ASM command processor 230 can call boot control 240 to reboot the ASM 200 to activate and load the updated configuration parameters.

In operation 535, it can be determined whether the ASM 200 hot-swap to the updated configuration parameters resulted in poorer performance than the previous configuration parameters, or whether the ASM was rebooted to the updated configuration parameters and either failed to boot or the updated configuration parameters resulted in poorer performance. If the ASM failed to boot or the previous configuration parameters delivered better performance, then in operation 540, the configuration parameters can be set, by reference, back to the previous configuration parameters. If reboot is required for the change to take effect, then in operation 540 the command processor 230 can call boot control 240 to reboot the ASM 200 back to the previous configuration parameters, otherwise the command processor 230 can hot-swap back to the previous configuration parameters.

As described above with respect to method 300, ASM 200 will check-in with server 250 at the end of the check-in timer expiration. At check-in, ASM 200 will send metrics data that contains, among other data, the currently active partition and configuration parameters on the ASM 200.

Referring now to FIG. 5B, if the command is "debug mode," then in operation 545 command processor 230 can parse the received command to determine any parameters that a particular debug command may specify. Command parameters can include, but are not limited to, a specific debug routine to run, a level of detail of logging, a duration of time to run the debug route, a time at which to stop the debug routine, or an event at which to stop the debug routine.

In operation 550, command processor 230 can set the debug mode according to the command received from the server 250. The debug command mode may have a more verbose logging requirement that gives a support technician additional information with which to diagnose a problem via ASM management 275. In operation 550 logging according to the debug command is enabled and started.

In operation 555, it can be determined whether a timer, a specific time, or event has occurred to trigger stopping the debug mode. If not, then in operation 565 the debug command continues logging according to the command and parameter(s), and method 500 continues at 555. If the timer, specific time, or event has triggered stopping the debug mode, then method 500 continues at operation 560.

In operation 560, command processor 230 can package up the log files generated by the debug command into one or more packages, encrypt and sign each package, and transmit each package over a secure communication channel to server 250.

Still referring to FIG. 5B, if the command is "reset parameters," then in operation 570, then ASM 200 command processor 230 will access a reference table that indicates the partition and location of the last used set of configuration parameters, prior to the currently active configuration parameters. Command processor 230 sets the reference to the last used configuration parameters and calls boot control 240 to reboot the ASM using the last used configuration parameters. In an embodiment, rather than rebooting, command processor 230 can hot-swap to the last used set of configuration parameters using a reference to the last used configuration parameters.

As described above with respect to method 300, ASM 200 will check-in with server 250 at the end of the check-in timer expiration. At check-in, ASM 200 will send metrics data that contains, among other data, the currently active configuration parameters on the ASM 200.

Still referring to FIG. 5B, if the command is "toggle start/stop software updates," then in operation 580 the ASM 200 command processor 230 will access a variable that indicates whether the ASM 200 is set to request updated software in response to server 250 indicating that a software update is needed. This variable enables the ASM 200 to stop a possible logic loop that results from the ASM 200 downloading updated software, the ASM 200 rebooting with the updated software, the reboot failing back to the old software, the sever 250 detecting that the ASM 200 is still on old software, and the server 250 sending a message to the ASM 200 to (re-) download the updated software. The server 250 keeps track of a count of retries that an ASM 200 downloads the updated software. In an embodiment, when the server detects the above-described logic loop, the server 250 can return an error code to the ASM 200. In an embodiment, when the server detects the above-described logic loop, the server 250 can send a "toggle start/stop software updates" command to the ASM 200 to stop the ASM 200 from requesting software updates. At a later date, a technician, or ASM management 275 logic, may send a command to the ASM 200 to reenable updates.

Figure 6:
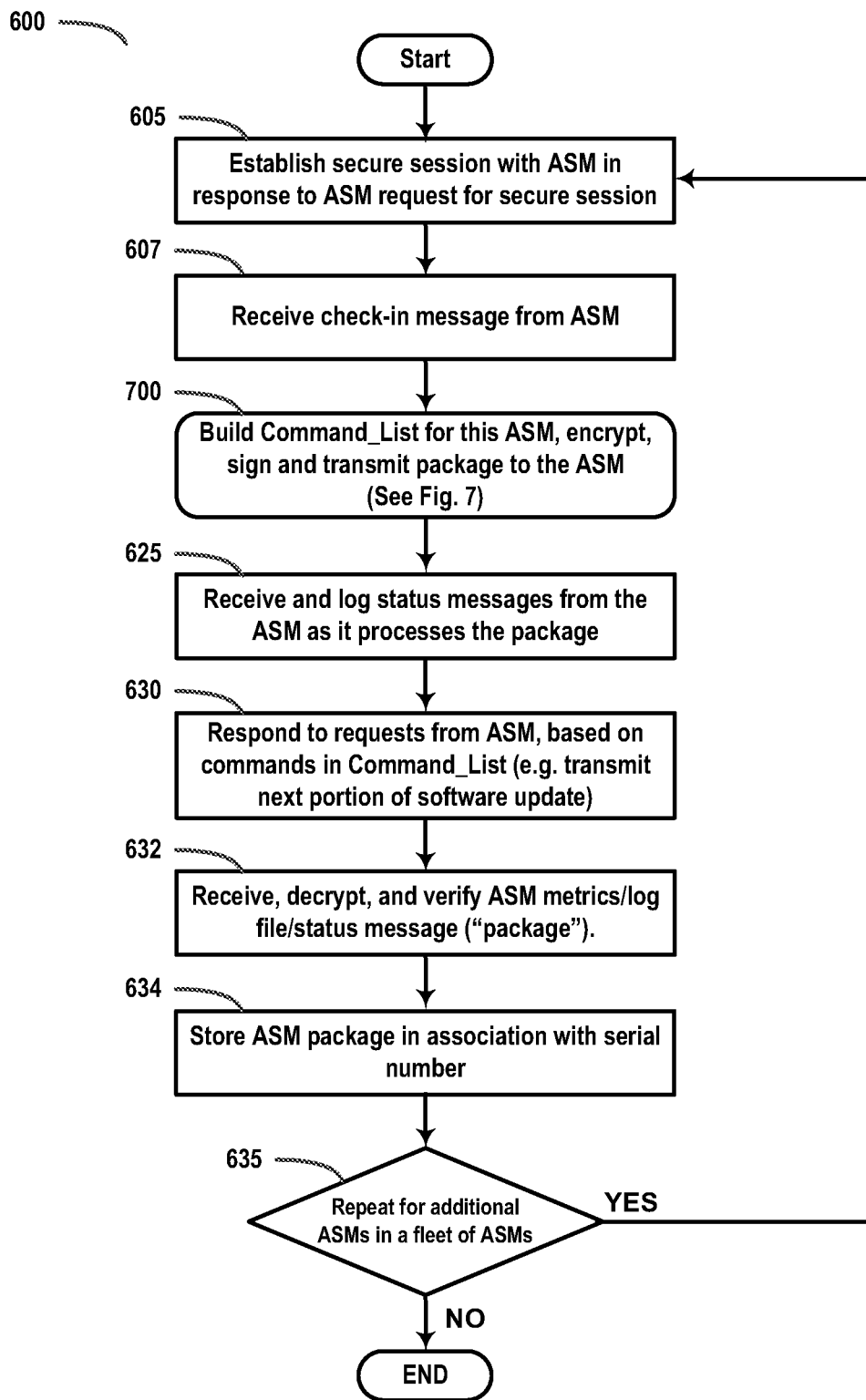
FIG. 6 illustrates an overview of a method of an antenna subsystem module management server managing an antenna subsystem module, according to one embodiment.

FIG. 6 illustrates an overview of a method 600 of an antenna subsystem module management server 250 managing an antenna subsystem module 200, according to one embodiment. ASM management server 250 receives encrypted, signed packages from an ASM 200 under at least three conditions: first, when a check-in timer within an ASM 200 indicates that it is time for the ASM 200 to check-in with the server 250 and does so with a check-in message including a header of information for the server 250, second, when the ASM 200 sends metrics data to server 250; third, when ASM 200 sends packages, status messages, or other data, encrypted and signed, to server 250 in response to a command sent from server 250 to ASM 200 for execution by ASM 200's command processor 230.

In operation 605, ASM management server 250 (or "server 250") can establish a 2-way Transport Layer Security (TLS) communication channel with ASM 200 in response to ASM 200's request for a secure communication channel.

In operation 607, server 250 can periodically receive a check-in message from ASM 200. In an embodiment, the check-in message contains data, such as in the form of a header or data package, that contains a serial number identifying the ASM 200 and associated reconfigurable holographic antenna, a software version being run on the ASM 200 and an active partition that is running the software version. Check-in message data may further include one or more configuration variables or parameters.

In operation 700, server 250 can build a list of zero or more commands for this ASM 200 to execute, add the list of commands to a package to be sent to the ASM 200 containing commands and data to execute the commands, encrypt and sign the package, optionally add a digital certificate to the package, and transmit the package to the ASM 200. Operation 700 is described in detail, below, with reference to FIG. 7.

In operation 625, server 250 can receive and store (log) one or more status messages received from the ASM 200, while the ASM executes a command in operation 700.

In operation 630, server 250 can receive, and respond to, requests from ASM based upon commands in the command list (e.g. transmit a next portion of a software update or updated configuration parameters).

In operation 632, server 250 can receive and decrypt metrics data, log file data, or status messages (generically, "package") from ASM 200. In an embodiment, server 250 can perform a checksum operation on the contents of the package and verify the checksum against a checksum stored in the package. In an embodiment, server 250 can verify that the package was received from a valid ASM 200 by a certificate included with the package. In an embodiment, the certificate can be verified with a third part server.

In operation 634, server 250 can analyze the package to extract the serial number of the ASM 200, the currently active partition and currently active software version of the ASM 200, and currently active configuration parameters of the ASM 200. The package received from ASM 200 can contain headers and data in any format agreed upon between the ASM 200 and server 250. In an embodiment, a header in the package contains a serial number uniquely identifying the ASM 200 and associated reconfigurable holographic antenna. Server 250 can look up the serial number in the ASM identities database 255 to determine whether the ASM 200 is known to server 250. If the ASM 200 serial number is not found in ASM identities database 255, then server 250 can add this ASM 200 to the ASM identities 255 database in association with the serial number of the ASM 200. Server 250 can store the package in ASM configuration and performance database 260. If the serial number is not found, the server 250 may store the information in the package, including the serial number of the device, for later analysis. In an embodiment, if the serial number is not found, the server 250 can return an error message indicating that the ASM 200 is not known to the server 250.

In operation 635, it can be determined whether the ASM 200 is related to additional ASM 200's in a fleet of ASMs. If so, method 600 can be repeated for each ASM 200 in the fleet of ASMs by continuing at operation 605. In an embodiment, a fleet of ASMs can be determined by an association among a plurality of ASMs in ASM identities database 255. ASMs 200 may be related by a common attribute in a variety of ways including, without limitation, a common owner of the ASMs, a common geo-location of the ASMs, a common model and/or age of the ASMs, or other attribute that the ASMs have in common. If it is determined that ASM 200 is not related to a fleet of ASM's, then method 600 ends.

Figure 7:
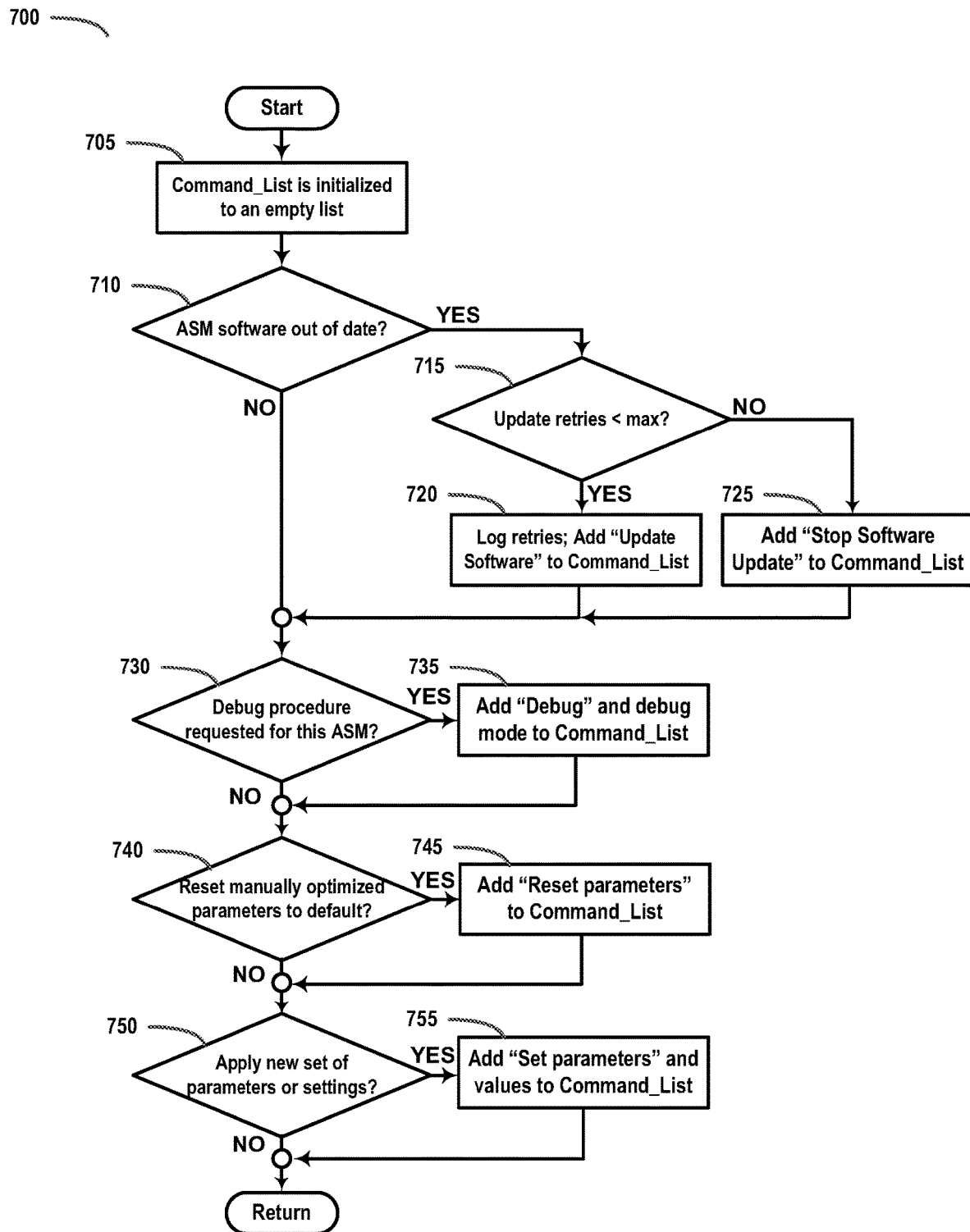
FIG. 7 illustrates a method that can be practiced on an antenna subsystem module management server for building a list of one or more commands for execution by an antenna subsystem module of a reconfigurable holographic antenna, according to one embodiment.

FIG. 7 illustrates a method 700 that can be practiced on an antenna subsystem module management server 250, of building a list of one or more commands for execution by an antenna subsystem module 200 of a reconfigurable holographic antenna, according to one embodiment.

In operation 705, a command list can store one or more commands for transmission to an ASM 200 by server 250. The command list can be a data structure such as a linked list of elements or an array of elements, the elements being text strings or numbers or other data type. The command list can be initialized to an empty list. In an embodiment, the command list can be initialized to an empty by setting a count of commands in the command list to zero, by setting an index into an array of commands in the command list to zero, the command list is empty, or by setting the command list to a null string.

In operation 710, it can be determined by the server 250 whether the control software on the ASM 200 is out of date. Server 250 can make this determination by accessing metrics data received from the ASM 200 and analyzed by server 250, or by looking up a previous metrics data or other data associated with the this particular in ASM configuration and performance database 260, and comparing the software version for this ASM 200 with a latest version of software available for this ASM 200. If the latest version of software is newer than the version currently running in the active partition of this ASM 200, then method 700 continues at operation 715, otherwise method 700 continues at operation 730.

In operation 715, server 250 can determine whether this ASM 200 has previously tried to install the most recent version of the software and has failed to successfully reboot the ASM to the latest version of the software more than a predetermined maximum number of times. If so, then method 700 continues at operation 725, otherwise method 700 continues at operation 720.

In operation 720, server 250 adds the "update software" command to the command list. Method 700 continues at operation 730.

In operation 725, server 250 adds the "stop software updates" command to the command list. Server 250 can detect that the ASM 200 has previously requested the updated software, and has tried and failed to reboot to the updated software a maximum number of times. It may be beneficial to stop the ASM 200 from continuing to request the updated software until a later time, such as when it has been determined why the ASM 200 fails to boot to the updated software. Method 700 continues at operation 730.

In operation 730, it can be determined whether a debug procedure has been requested for this ASM 200. If so, in operation 735 the "debug" command and any command parameters can be added to the command list. A debug command can be requested by a support technician via ASM management 275. A support technician may be aware of a particular problem that a user is having with their ASM 200. The support technician can use ASM management 275 to log into server 250, access the ASM configuration and performance database 260, and request a particular debug command or debug mode for this ASM 200. The server 250 can add this debug command to the command list for this ASM, along with any necessary data or command parameters. In an embodiment, a debug parameter can include a level of detail that the debug command should produce as log data by the ASM 200. In an embodiment, the debug command can include a timer value, a specified time, or an identified event that should trigger the end of the debug command.

In operation 740, it can be determined whether the configuration parameters of the ASM 200 need to be reset to previous, or default, values. By analyzing one or more metrics for the ASM, received from the ASM and/or stored in the ASM configuration performance database 260, the server 250 can determine that a user has manually optimized one or more configuration variables of the ASM 200 and can further determine that performance has degraded as a consequence of the changed configuration parameters. The server 250, or a support technician, can determine that the configuration parameters should be reset to previous values or default values. If so, then in operation 745 the command "reset parameters" can be added to the command list. In an embodiment, additional data for the command can include specifying one or more particular parameters that are to be reset, rather than resetting all parameters.

In operation 750, it can be determined whether to set one or more parameters to a certain value. If so, then in operation 755 the "set parameters" command, and any necessary additional data, should be added to the command list. New values for one or more configuration parameters may have been determined to yield better performance for the electrically steered antenna coupled to ASM 200. One or more configuration parameters can be set using the "set parameters" command and additional data, such as the particular configuration parameter(s) to set and the value(s) for the configuration parameter(s) to be set to. Method 700 ends.

Figure 8:
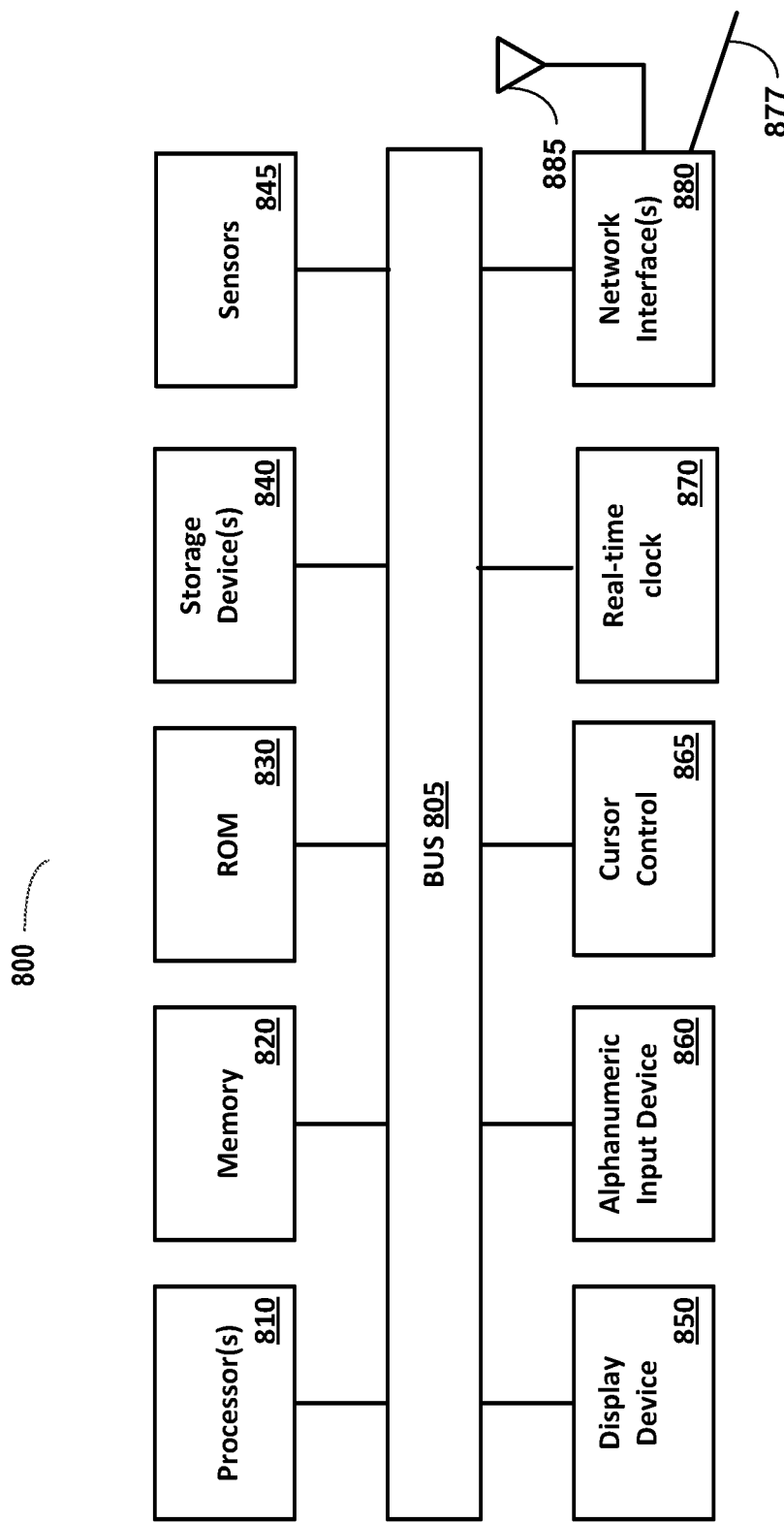
FIG. 8 illustrates, in block diagram form, hardware upon which the functionality described herein can be practiced, according to some embodiments.

FIG. 8 is a block diagram of one embodiment of a computing system 800. Computing system 800 can be used to implement the above-described computer system for a support technician via ASM management 275, a combiner 201, an antenna subsystem module 200, or a server 250. Not all of the below-described components are required for every embodiment. The computing system illustrated in FIG. 8 is intended to represent a range of computing systems (either wired or wireless) including, for example, desktop computer systems, laptop computer systems, cellular telephones, personal digital assistants (PDAs) including cellular-enabled PDAs, set top boxes, entertainment systems or other consumer electronic devices. Alternative computing systems may include more, fewer and/or different components.

Computing system 800 includes bus 805 or other communication device to communicate information, and processor 810 coupled to bus 805 that may process information. While computing system 800 is illustrated with a single processor, computing system 800 may include multiple processors and/or co-processors 810. Computing system 800 further may include random access memory (RAM) or other dynamic storage device 820 (referred to as main memory), coupled to bus 805 and may store information and instructions that may be executed by processor(s) 810. Main memory 820 may also be used to store temporary variables or other intermediate information during execution of instructions by processor 810.

Computing system 800 may also include read only memory (ROM) 830 and/or other static, non-transitory storage device 840 coupled to bus 805 that may store static information and instructions for processor(s) 810. Data storage device 840 may be coupled to bus 805 to store information and instructions. Data storage device 840 such as flash memory or a magnetic disk or optical disc and corresponding drive may be coupled to computing system 800. Any of memory 820, ROM 830, or storage device 840 can be programmed to store executable instructions that, when executed by processor(s) 810 can perform any of the above operations or functionality.

Computing system 800 can also include sensors 845, coupled to bus 805. Sensors 845 can include a GPS receiver, a three-axis compass, a 3-axis accelerometer, a 3-axis gyro, a 3-axis magnetometer, and other sensors to provide location and orientation information to processor(s) 810. An ASM 200 may require some or all of sensors 845.

Computing system 800 may also be coupled via bus 805 to display device 850, such as a light-emitting diode display (LED), touch screen display, or liquid crystal display (LCD), to display information to a user. Computing system 800 can also include an alphanumeric input device 860, including alphanumeric and other keys, which may be coupled to bus 805 to communicate information and command selections to processor(s) 810. Another type of user input device is cursor control 865, such as a touchpad, a mouse, a trackball, or cursor direction keys to communicate direction information and command selections to processor(s) 810 and to control cursor movement on display 850. Computing system 800 may further include a real-time clock 870. The real-time clock 870 may be used for generating date/time stamps for data records, computing elapsed time, and other time-keeping functions. A real-time clock 870 can be a battery-backed chipset with a settable date and time. Alternatively, a real-time clock 870 may include logic to retrieve a real-time from a network source such as a server or an Internet server via network interfaces 880, described below. Real-time clock can be used to implement timers in some embodiments.

Computing system 800 further may include one or more network interface(s) 880 to provide access to a network, such as a local area network. Network interface(s) 880 may include, for example, a wireless network interface having antenna 885, which may represent one or more antenna(e). Computing system 800 can include multiple wireless network interfaces such as a combination of Wi-Fi, Bluetooth® and cellular telephony interfaces. Network interface(s) 880 may also include, for example, a wired network interface to communicate with remote devices via network cable 887, which may be, for example, an Ethernet cable, a coaxial cable, a fiber optic cable, a serial cable, or a parallel cable. Network interfaces may include connectivity to a satellite communication system.

In one embodiment, network interface(s) 880 may provide access to a local area network, for example, by conforming to IEEE 802.11b, 802.11g, or 802.11n standards, and/or the wireless network interface may provide access to a personal area network, for example, by conforming to Bluetooth® standards. Other wireless network interfaces and/or protocols can also be supported, such as ground-to-satellite communications. In addition to, or instead of, communication via wireless LAN standards, network interface(s) 880 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for managing a satellite device, comprising:
   periodically transmitting, by the satellite device, a check-in message to a satellite management server, the check-in message including a serial number of the satellite and a current software version of the satellite device;
   receiving a satellite management command from the satellite management server, in response to the periodic transmission of the check-in message to the satellite management server, wherein the management command is based at least in part upon an analysis of the check-in message by the satellite management server;
   preserving a partition of storage that contains a state of a software of the satellite device prior to the receiving the management command to update the software;
   in response to the satellite device receiving the management command from the satellite device management server to stop software updates of the satellite device, setting a flag in the satellite device to stop software updates, wherein the management command is received in response to the satellite device management server determining that the satellite device has failed to successfully update software a predetermined number of times;
   in response to the management command received from the satellite management server being a software update command that instructs the satellite device to download a first portion of software and/or data from the satellite management server:
     determining whether the flag is set in the satellite device to stop software updates;
     in response to the flag being set to stop software updates, not requesting any portion of the software from the satellite management server, otherwise:
       requesting by the satellite device, that the first portion be downloaded to the satellite device;
       receiving, decrypting, and verifying the downloaded first portion, and installing the first portion in a storage partition;
       rebooting the satellite device to the storage partition to make the downloaded software and/or data active for the satellite device;
   in response to the satellite device failing to successfully reboot to an updated version of the software:
     receiving a command from the satellite management server to switch back to the preserved partition of storage; and
     rebooting the satellite device to the preserved partition of storage.

2. The method of claim 1, further comprising:
   establishing, by the satellite device, a secure connection having 2-way transport layer security with mutual authentication with the satellite management server, prior to receiving the satellite device management command; and
   encrypting and digitally signing the operation and configuration data prior to transmitting the satellite device operation and data to the satellite management server.

3. The method of claim 1, further comprising:
   requesting, by the satellite device, that a second portion of the software and/or data be downloaded to the satellite device;
   in response to determining by the satellite device, prior to receiving the second portion, that the secure connection has been lost:
     waiting, by the satellite device, a period of time and reestablishing the secure connection with the satellite management server;
     requesting, by the satellite device, that the second portion of the software and/or data be downloaded to the satellite device.

4. The method of claim 1, further comprising:
   after receiving, decrypting, and verifying the downloaded first portion, transmitting a status message to the satellite management server indicating that the first portion was received, decrypted and verified.

5. The method of claim 1, further comprising:
in response to the satellite device receiving a diagnostic command tat does not require downloading the first portion of software and/or data, and the diagnostic command specifying a debug mode:
setting a control software of the satellite device to activate the debug mode;
logging information related to the debug mode; and
encrypting, digitally signing, and transmitting the logged information to the satellite management server.

6. The method of claim 1, wherein the satellite device comprises an antenna subsystem module of a reconfigurable holographic antenna, and the check-in message further includes power-on self-test (POST) results, configuration parameters of the reconfigurable holographic antenna, and temperature of a plurality of segments of the reconfigurable holographic antenna.

7. The method of claim 1, wherein the satellite device is a mechanically steered antenna.

8. The method of claim 1, wherein the satellite device is an electronically scanned antenna.

9. The method of claim 2, wherein the secure connection is established over a high-latency, unreliable network connection whose connection cannot be verified at any given moment, and the connection is made without access to a ground-based network connection having high speed and reliability.

10. A non-transitory machine-readable medium having instructions stored therein, which when executed by a processor, causes the processor to perform operations for managing a satellite device, the operations comprising:
periodically transmitting, by the satellite device, a check-in message to a satellite management server, the check-in message including a serial number of the satellite device and a current software version of the satellite device;
receiving a satellite device management command from the satellite management server, in response to the periodic transmission of the check-in message to the satellite management server, wherein the management command is based at least in part upon an analysis of the check-in message by the satellite management server;
preserving a partition of storage that contains a state of a software of the satellite device prior to the receiving the management command to update the software;
in response to the satellite device receiving the management command from the satellite device management server to stop software updates of the satellite device, setting a flag in the satellite device to stop software updates, wherein the management command is received in response to the satellite device management server determining that the satellite device has failed to successfully update software a predetermined number of times;
in response to the management command received from the satellite management server being a software update command that instructs the satellite device to download a first portion of software and/or data from the satellite management server:
determining whether the flag is set in the satellite device to stop software updates;
in response to the flag being set to stop software updates, not requesting any portion of the software from the satellite management server, otherwise:
requesting by the satellite device, that the first portion be downloaded to the satellite device;
receiving, decrypting, and verifying the downloaded first portion, and installing the first portion in a storage partition;
rebooting the satellite device to the storage partition to make the downloaded software and/or data active for the satellite device;
in response to the satellite device failing to successfully reboot to an updated version of the software:
receiving a command from the satellite management server to switch back to the preserved partition of storage; and
rebooting the satellite device to the preserved partition of storage.

11. The medium of claim 10, the operations further comprising:
establishing, by the satellite device, a secure connection having 2-way transport layer security with mutual authentication with the satellite management server, prior to receiving the satellite device management command; and
encrypting and digitally signing the operation and configuration data prior to transmitting the satellite device operation and data to the satellite management server.

12. The medium of claim 10, the operations further comprising:
requesting, by the satellite device, that a second portion of the software and/or data be downloaded to the satellite device;
in response to determining by the satellite device, prior to receiving the second portion, that the secure connection has been lost:
waiting, by the satellite device, a period of time and reestablishing the secure connection with the satellite management server;
requesting, by the satellite device, that the second portion of the software and/or data be downloaded to the satellite device.

13. The medium of claim 10, the operations further comprising:
after receiving, decrypting, and verifying the downloaded first portion, transmitting a status message to the satellite management server indicating that the first portion was received, decrypted and verified.

14. The medium of claim 10, the operations further comprising:
in response to the satellite device receiving a diagnostic command that does not require downloading a first portion of software and/or data, and the diagnostic command specifying a debug mode:
setting a control software of the satellite device to activate the debug mode;
logging information related to the debug mode; and
encrypting, digitally signing, and transmitting the logged information to the satellite management server.

15. The medium of claim 10, wherein the satellite device comprises an antenna subsystem module of a reconfigurable holographic antenna, and the check-in message further includes power-on self-test (POST) results, configuration parameters of the reconfigurable holographic antenna, and temperature of a plurality of segments of the reconfigurable holographic antenna.

16. A data processing system, comprising:
a processor; and
a memory coupled to the processor to store instructions, which when executed by the processor, cause the processor to perform operations for managing a satellite communications, the operations including:

periodically transmitting, by the satellite device, a check-in message to a satellite management server, the check-in message including a serial number of the satellite device and a current software version of the satellite device;

receiving a satellite device management command from the satellite management server, in response to the periodic transmission of the check-in message to the satellite management server, wherein the management command is based at least in part upon an analysis of the check-in message by the satellite management server;

preserving a partition of storage that contains a state of a software of the satellite device prior to the receiving the management command to update the software;

in response to the satellite device receiving the management command from the satellite device management server to stop software updates of the satellite device, setting a flag in the satellite device to stop software updates, wherein the management command is received in response to the satellite device management server determining that the satellite device has failed to successfully update software a predetermined number of times;

in response to the management command received from the satellite management server being a software update command that instructs the satellite device to download a first portion of software and/or data from the satellite management server:

determining whether the flag is set in the satellite device to stop software updates;

in response to the flag being set to stop software updates, not requesting any portion of the software from the satellite management server, otherwise:

requesting by the satellite device, that the first portion be downloaded to the satellite device;

receiving, decrypting, and verifying the downloaded first portion, and installing the first portion in a storage partition;

rebooting the satellite device to the storage partition to make the downloaded software and/or data active for the satellite device;

in response to the satellite device failing to successfully reboot to an updated version of the software:

receiving a command from the satellite management server to switch back to the preserved partition of storage; and rebooting the satellite device to the preserved partition of storage.

17. The system of claim 16,
establishing, by the satellite device, a secure connection having 2-way transport layer security with mutual authentication with the satellite management server, prior to receiving the satellite device management command; and encrypting and digitally signing the operation and configuration data prior to transmitting the satellite device operation and data to the satellite management server.

18. The system of claim 16,
requesting, by the satellite device, that a second portion of the software and/or data be downloaded to the satellite device;

in response to determining by the satellite device, prior to receiving the second portion, that the secure connection has been lost:

waiting, by the satellite device, a period of time and reestablishing the secure connection with the satellite management server;

requesting, by the satellite device, that the second portion of the software and/or data be downloaded to the satellite device.

19. The system of claim 16,
after receiving, decrypting, and verifying the downloaded first portion, transmitting a status message to the satellite management server indicating that the first portion was received, decrypted and verified.

20. The system of claim 16,
in response to the satellite device receiving a diagnostic command that does not require downloading a first portion of software and/or data, and the diagnostic command specifying a debug mode:

setting a control software of the satellite device to activate the debug mode;

logging information related to the debug mode; and encrypting, digitally signing, and transmitting the logged information to the satellite management server.

21. The system of claim 16, wherein the satellite device comprises an antenna subsystem module of a reconfigurable holographic antenna, and the check-in message further includes power-on self-test (POST) results, configuration parameters of the reconfigurable holographic antenna, and temperature of a plurality of segments of the reconfigurable holographic antenna.

* * * * *